(12) United States Patent
Lee et al.

(10) Patent No.: US 7,914,636 B2
(45) Date of Patent: Mar. 29, 2011

(54) SYNERGISTIC PROCESS AND RECIPE FOR FABRICATION OF A HIGH INTEGRITY MEMBRANE ELECTRODE ASSEMBLY OF SOLID OXIDE FUEL CELL

(75) Inventors: Maw-Chwain Lee, Taoyuan County (TW); Wei-Xin Kao, Taoyuan County (TW); Tai-Nan Lin, Taoyuan County (TW); Yang-Chuang Chang, Taoyuan County (TW); Chun-Hsiu Wang, Taoyuan County (TW)

(73) Assignee: Institute of Nuclear Energy Research, Jiaan Village, Longtan, Taoyuan (TW)

( * ) Notice: Subject to any disclaimer, the term of this patent is extended or adjusted under 35 U.S.C. 154(b) by 162 days.

(21) Appl. No.: 11/853,033

(22) Filed: Sep. 11, 2007

(65) Prior Publication Data

US 2009/0068373 A1   Mar. 12, 2009

(51) Int. Cl.
*C03B 29/00* (2006.01)
(52) U.S. Cl. .................................................... 156/89.11
(58) Field of Classification Search ............... 156/89.11; 241/21, 29
See application file for complete search history.

(56) References Cited

U.S. PATENT DOCUMENTS

| | | | | |
|---|---|---|---|---|
| 4,242,221 | A | * | 12/1980 | Cusano et al. ............... 264/1.21 |
| 4,721,556 | A | * | 1/1988 | Hsu .............................. 204/258 |
| 4,788,046 | A | * | 11/1988 | Barringer et al. ............. 264/661 |
| 5,143,751 | A | * | 9/1992 | Richards et al. ........... 427/126.3 |
| 5,297,480 | A | * | 3/1994 | Miyashita et al. ............. 100/90 |
| 6,436,565 | B1 | * | 8/2002 | Song et al. ....................... 429/31 |
| 6,450,850 | B1 | * | 9/2002 | Nunomura ...................... 445/24 |
| 6,661,084 | B1 | * | 12/2003 | Peterson et al. ............. 257/680 |
| 6,692,855 | B1 | * | 2/2004 | Aizawa et al. .................. 429/30 |
| 6,703,153 | B1 | * | 3/2004 | Cubukcu et al. ................ 429/30 |
| 7,195,794 | B2 | * | 3/2007 | Chen et al. ..................... 427/115 |
| 2002/0076593 | A1 | * | 6/2002 | Helfinstine et al. ............. 429/30 |
| 2002/0168308 | A1 | * | 11/2002 | Loffler et al. ................. 422/211 |
| 2003/0027033 | A1 | * | 2/2003 | Seabaugh et al. ............... 429/40 |
| 2004/0175604 | A1 | * | 9/2004 | Ito et al. .......................... 429/30 |
| 2005/0176575 | A1 | * | 8/2005 | Chiu et al. ..................... 501/134 |
| 2005/0181253 | A1 | * | 8/2005 | Finnerty et al. ................. 429/30 |
| 2006/0131182 | A1 | * | 6/2006 | Mazanec et al. ............... 205/551 |
| 2006/0197264 | A1 | * | 9/2006 | Cutler et al. ................... 264/618 |
| 2006/0199057 | A1 | * | 9/2006 | Hiwatashi ....................... 429/30 |

* cited by examiner

*Primary Examiner* — Mark A Osele
*Assistant Examiner* — Nickolas Harm

(57) ABSTRACT

A recipe and two sequential processes for fabrication of electrode substrates of solid oxide fuel cells (SOFCs) are described in this invention. The typical recipe consists of 50~86 wt % electrolyte (8YSZ) or 50~80 wt % anode electrode (NiO/8YSZ), 12~22 wt % MEK (solvent 1), 5~9 wt % EtOH (solvent 2), 1~2 wt % TEA (dispersant), 0.5~2 wt % DBP (plasticizer 1), 0.5~2 wt % PEG (plasticizer 2), 3~6 wt % PVB (binder), and 0.1~10 wt % graphite (pore former). Two sequential processes include: 1. The process for preparation of the green tape slurry from materials of the recipe, 2. The synergistic process for fabrication of a high integrity membrane electrode assembly (MEA) of SOFC from the prepared electrode substrates.

13 Claims, 11 Drawing Sheets

SYNERGISTIC PROCESS AND RECIPE FOR FABRICATION OF A HIGH INTEGRITY MEMBRANE ELECTRODE ASSEMBLY OF SOLID OXIDE FUEL CELL

BACKGROUND OF THE INVENTION

1. Field of the Invention

The invention is related to an innovative process for membrane electrode assembly, from formulating with raw materials, and preparing electrodes of planar SOFC-MEA containing anode and electrolyte substrate slurry, to making green tape of electrode by tape casting process. The green tape is cast into green substrate by lamination process, and then finished into high integrity green substrate by vacuum hot press system (VHPS). Through calcinations and sintering, the green substrate can be made into electrode substrate with high mechanical strength, controllable micro-structural characteristics (porosity/gas permeability), thickness, and dimensions. Further, screen-printing, sputtering coating, spin coating, and spraying processes are alternatively employed to enable the production of high-performance SOFC unit cell. Their application to SOFC assures high reliability, durability and low degradation rate of the unit cell. The raw materials the invention refers to are YSZ/GDC/YDC/LSGM electrolytes, NiO+YSZ/GDC+NiO/YDC+NiO/LSGM+NiO anode materials and LSM/LSCF cathode materials. But they are not limited to the above materials.

2. Description of the Prior Art

SOFC has high conversion efficiency, low noise, low pollution, high reliability and fuel diversity, as well as the potential to replace internal combustion engine in solving energy shortage issue. Especially when fossil fuels are in short supply, and hydrogen, natural gas and LPG become the alternatives; SOFC is a very important energy conversion device and plays a key role in the new energy era.

The critical goals for the Planar Type Solid Oxide Fuel Cell—Membrane Electrode Assembly (SOFC-MEA) currently under development include high performance, high durability, high stability and low degradation rate of MEA. To achieve the above goals, the key factors are the MEA materials and structure design. Changing the materials and MEA structure also changes MEA properties. For materials, the electrolyte is mainly 8YSZ, which operation temperature depends on the supported substrate structure. Electrolyte Supported Cell (ESC) is operated at temperature range of 800~1000° C. with electrolyte thickness of 150~300 μm and termed as first generation SOFC. The second generation SOFC adopts Anode Supported Cell (ASC), with operation temperature range of 650~850° C. and electrolyte thickness of 10 μm. NiO+8YSZ are the anode materials for ASC/ESC with thicknesses of 50~60 μm (ESC) and 500~1200 μm (ASC). The cathode materials are mainly LSM and LSCF having thickness 30~60 μm. New electrolyte materials and cathode materials are actively under development in many international laboratories. It is expected the new materials lower SOFC-MEA operation temperature to 500~700° C. Then, the modules and parts for SOFC Stack, like interconnector, can use metal materials to replace ceramic materials. The advantages will include easy fabrication, increased mechanical strength/stability/durability and reduced cost. Increasing SOFC marketing competitiveness and penetration will create huge niche for SOFC industry. The technical development in universities and national laboratories emphasizes materials development in the hope to lower resistance, increase ionic conductivity/electric conductivity, and increase SOFC powder density. On Nature magazine, there are many publications on new electrolytes like LSGM, YDC, LSGMC and 10ScCeSZ, or new cathode materials like LSM/LSCF/LSF/LSC/LSCM/BSCF/SSC. In industry, the emphasis is on material processing technology and performance stability. If the right materials are selected to achieve the desired properties and high reliability, and work with SOFC-MEA process and structure design, MEA mechanical/chemical stability, durability, energy conversion and powder output will be upgraded. Then, SOFC will become the best device in energy conversion.

Many foreign laboratories have been through 15~20 years investing in R&D and testing SOFC performance, also overcoming technical barriers and creating business opportunities. There is collaboration between corporation and national laboratory and joint venture is formed. Resource exchange, integration, merger or cooperation are taking place in Europe and America, such as ECN and InDEC, or H.C. Stark, IKTS and Karafol/Straxera/Webasto, NETL/SECA, EPFL and HT Ceramix. In the US, their national laboratories such as PNNL et al. and six large companies including Siemens Westinghouse and GE and Delphi et al. are collaborating on verification of technical reliability, cost analysis and reduction to establish SOFC industry.

The SOFC-MEA related materials that have potential for commercialization include those mentioned previously, such as 8YSZ as electrolyte, NiO+8YSZ as anode materials, LSM/LSCF and LSF/LSC as cathode materials. As for MEA processes, they are rarely published and proprietary to the companies who develop and do not want to patent the technologies because they are afraid their interest be hurt when the patented technologies are copied or modified by others.

Current SOFC-MEA processes are based on tape casting to produce green tape of electrode first. The following lamination process allows adjustment for the thickness and geometry for green substrate. Then, the calcinations and sintering process produces electrode substrate or half cell substrate (including electrolyte layer and support electrode layer). At last, the screen-printing technique is used to build cathode layer onto half cell board, which completes the production of SOFC-MEA. The main drawbacks for the SOFC-MEA produced in this way are: insufficient mechanical strength, poor stability and durability (poor resistance to Redox Cycling/Thermal Cycling). Under the basic requirement for porosity (beneficial for gas-solid reaction mechanism) in cathode and anode, it is necessary to sacrifice mechanical strength. Later, this will cause rupture and failure to the assembled cell stack. Such a drawback hinders the development of perfect structure for SOFC and prompts immediate slurry.

SUMMARY OF THE INVENTION

The main objective for the invention is to provide a material recipe and its process to produce HI-SOFC-MEA or HI-Unit Cell. Such a HI-SOFC-MEA has ① high mechanical strength and hardness ② adjustable substrate porosity and gas permeability ③ controllable MEA multi-layer materials and microstructure or density ④ controllable MEA layer number and thickness ⑤ high sintering density ⑥ high stability and robust operational capability. Due to the above special characteristics, the HI-SOFC-MEA can increase cell output powder density and fuel energy conversion efficiency. The most important feature is its high mechanical strength that is suitable for Cell Stack assembly and test. Cells with fragility tend to cause rupture or lower reliability and yield for cell stacks during production or testing process.

The content for the invention contains one recipe and two (electrode green substrate and electrode substrate) processes. They are described as follows respectively:

Recipe and process for producing electrode green substrate:

The typical recipe for the electrode substrate slurry is listed in Table 1.

TABLE 1

Slurry Recipe and Process to Produce SOFC-MEA Electrode Substrate

| | | Recipe Content Materials/Name(a) | Weight Percentage Range (%) | Materials Function | Note(c) |
|---|---|---|---|---|---|
| 1. Electrode Materials | | 1. 8YSZ (Electrolyte) | 50~86(approx. optimized QOV (b) = 68.0) | Electrolyte Materials | For Electrolyte Substrate/Layer (d) |
| | | 2. NiO/8YSZ (Anode) | 50~86(approx. optimized QOV(b) = 68.0) | Anode Materials | For Anode Substrate/Layer |
| 2. Organic Additives | Organic Solvent | 3. MEK (Solvent 1) | 12~22(approx. optimized QOV(b) = 16.0) | Solvent Media to Dissolve Electrode Materials | Or other alternative solvents |
| | | 4. EtOH (Solvent 2) | 5~9(approx. optimized QOV(b) = 8.0) | Solvent Media to Dissolve Electrode Materials | Or other alternative solvents |
| | Dispersant | 5. TEA (Dispersant) | 1~2(approx. optimized QOV(b) = 1.5) | Disperse Electrode Materials into Solvent Media | Or other alternative dispersants |
| | Plasticizer | 6. DBP (Plasticizer 1) | 0.5~2.0(approx. optimized QOV(b) = 1.0) | Adjust green tape plasticity (high)/ viscosity (low)/ elastic coefficient (low) | Or other alternative plasticizers |
| | | 7. PEG (Plasticizer 2) | 0.5~2.0(approx. optimized QOV(b) = 1.0) | Adjust green plasticity (low)/viscosity (high)/elastic coefficient (high)/fracture strength (high) | Or other alternative plasticizers |
| | Binder | 8. PVB (Polyvinylbutyral) (Binder) | 3~6(approx. optimized QOV (b) = 4.5) | Bonding strength/binding strength for electrolyte materials | Or other alternative binders |
| 3. Pore Former | | 9. Graphite (Pore Former) | 0.1~10 wt % of anode materials | Adjust porosity and gas permeability for anode substrate | Or other alternative pore formers |

Notes:

(a)Compound Formulas are listed on Table 2;

(b)QOV = Quasi-Optimum Value;

(c)Other alternative organic additives can be used if necessary. The final tape casting slurry has viscosity range 100~1500 cp, which selection depends on green thickness;

(d)other alternative electrolytes: GDC/YDC/SDC/LSGM et al.

Primary materials include a. electrode materials, 8YSZ as electrode materials and NiO+8YSZ as anode materials; b. organic additives, MEK and EtOH as organic solvents, TEA as dispersant, DBP and PEG as plasticizers, PVB as binder; c. graphite as pore former.

The weight percentages for materials in the recipes are also listed in Table 1. The compound formulas or ingredients are listed in Table 2.

TABLE 2

Major Compound Formulas or Ingredients

| Material Short Name | Chemical Formula (Representative Ingredient) | Note |
|---|---|---|
| YSZ | $(Y_2O_3)_{0.08}(ZrO_2)_{0.92}$ | |
| MEK | $CH_3COC_2H_5$ | |
| EtOH | $C_2H_5OH$ | |
| TEA | $C_6H_{15}NO_3$ | |
| DBP | $C_{16}H_{22}O_4$ | |
| PEG | $OH(C_2H_4O)_nH$ | |
| PVB | Polyvinyl Butyral | Chemical formula (NA) |
| GDC | $Gd_{0.2}Ce_{0.8}O_{1.9}$ | |
| YDC | $Y_{0.08}Ce_{0.92}O_{3\pm\delta}$ | |
| LSGM | $La_{0.8}Sr_{0.2}Ga_{0.85}Mg_{0.15}O_{3\pm\delta}$ | |
| LSM | $La_{0.8}Sr_{0.2}MnO_3$ | |
| LSCF | $La_{0.6}Sr_{0.4}Co_{0.2}Fe_{0.8}O_{3\pm\delta}$ | |
| LSC | Lanthanum Strontium Cobaltite | Chemical formula (NA) |
| LSF | Lanthanum Strontium Ferrite | Chemical formula (NA) |
| LSCM | $La_{0.8}Sr_{0.2}Co_{0.85}Mg_{0.15}O_{3\pm\delta}$ | |

For electrolyte substrate/layer recipe, its optimum composition in weight percentage is: 8YSZ (68 wt %), MEK (17 wt %), EtOH (7 wt %), TEA (1.5 wt %), DBP (1.0 wt %), PEG (1.0 wt %), PVB (4.5 wt %) and pore former (0. wt %). Since the electrolyte layer requires "zero gas permeability and 100% tightness", there is no need of pore former. For anode substrate/layer recipe, the optimum composition is: NiO+ 8YSZ (68 wt %) (NiO/8YSZ has weight ratio 50/50 (approximately optimum value)), MEK (17 wt %), EtOH (7 wt %), TEA (1.5 wt %), DBP (1.0 wt %), PEG (1.0 wt %), PVB (4.5 wt %), pore former (graphite) (0.1~10 wt % of anode material). The amount of pore formers can be adjusted according to the porosity required by anode substrate. The weight percentage in Table 1 can be adjusted according to the powder characteristics of the electrode materials (pore diameter distribution and specific surface area et al.). The goal is to produce high uniformity and high quality green products with suitable operation parameters for tape casting (such as thickness/density/operational feasibility). The electrode materials and pore formers in the recipe need pretreatment. The primary process is to grind the electrode powder materials down to 200~300 nm by a ball mill (containing zirconium dioxide). Then, the powder materials, organic solvents and dispersants are ground together inside the ball mill for about 24~48 hours (adjustable to reduce grinding time) to attain uniformity. At last, plasticizers and binders are added to the ball mill for grinding for another 24~48 hours (adjustable to reduce grinding time) to attain complete uniformity and slurry. To attain the required green thickness, it is necessary to do fine adjustment of recipe and carryout viscosity measurement and adjustment. If the green thickness is 10~200 μm, the slurry viscosity is 100~1500 cp (depending on the original powder characteristics; experience and techniques are essential to process optimization), so the optimal viscosity will facilitate tape casting operation.

Tape casting process can achieve good quality green tape with good techniques and compliance to operation procedures for any specific equipment model.

(2) Process for Producing Electrode Substrate:

The green tape produced from previous (1) process is made into a single layer green product in certain size by punching/ blanking. Then a number of green products are selected to go through inspection, stacking and Lamination Process (LP) to produce electrode green substrate-A with definite thickness and shape. The lamination process has temperature at 60~100° C. and pressure at 13.79~34.48 MPa (2000~5000 psi). At this time, the green substrate-A density is 40% of the theoretical density for the same ceramic oxides as the electrode materials. The green substrate-A will go to the second stage VHPS to produce green substrate-B. The process vacuum is $1.33 \times 10^{-7} \sim 10^{-8}$ MPa ($10^{-3} \sim 10^{-4}$ torrs and pressure is 1158.3 MPa ($1.68 \times 10^{55}$ psi) (area=9 cm$^2$)~104.8 MPa ($1.52 \times 10^4$ psi) (area=100 cm$^2$), and temperature is 500° C. The density for this green substrate-B can reach 70% of the theoretical density for the same ceramic oxides as the electrode materials. Such two-stage vacuum heat lamination process is defined as Novel Synergistic Process (NSP). During LP stage, the green is placed freely on the pressboard. While during VHPS stage, the green is sealed and placed in the mold with definite size. The electrode green substrate through NSP process has high integrity. After calcinations/sintering, the electrode ceramic substrate has high integrity and extremely high mechanical strength. Further through other treatments or processes for other electrode layers (like cathode or electrolyte), such as screen-printing, sputtering coating, plasma coating/spraying, spin coating et al., the unit cell is produced with unique properties, including high mechanical strength (suitable for cell stack assembly and testing), high durability and stability. This is called "high integrity fuel cell membrane electrode assembly". By changing the amount of pore former, it is possible to adjust the content and microstructure for the anode substrate to vary the porosity between different layers, to increase gas permeability rate, to increase cell energy conversion efficiency and output powder density. Thus, the key technology to produce SOFC-MEA is developed to improve the product specification requirements and performance.

DETAILED DESCRIPTION OF THE PREFERRED EMBODIMENT

Figure 1:
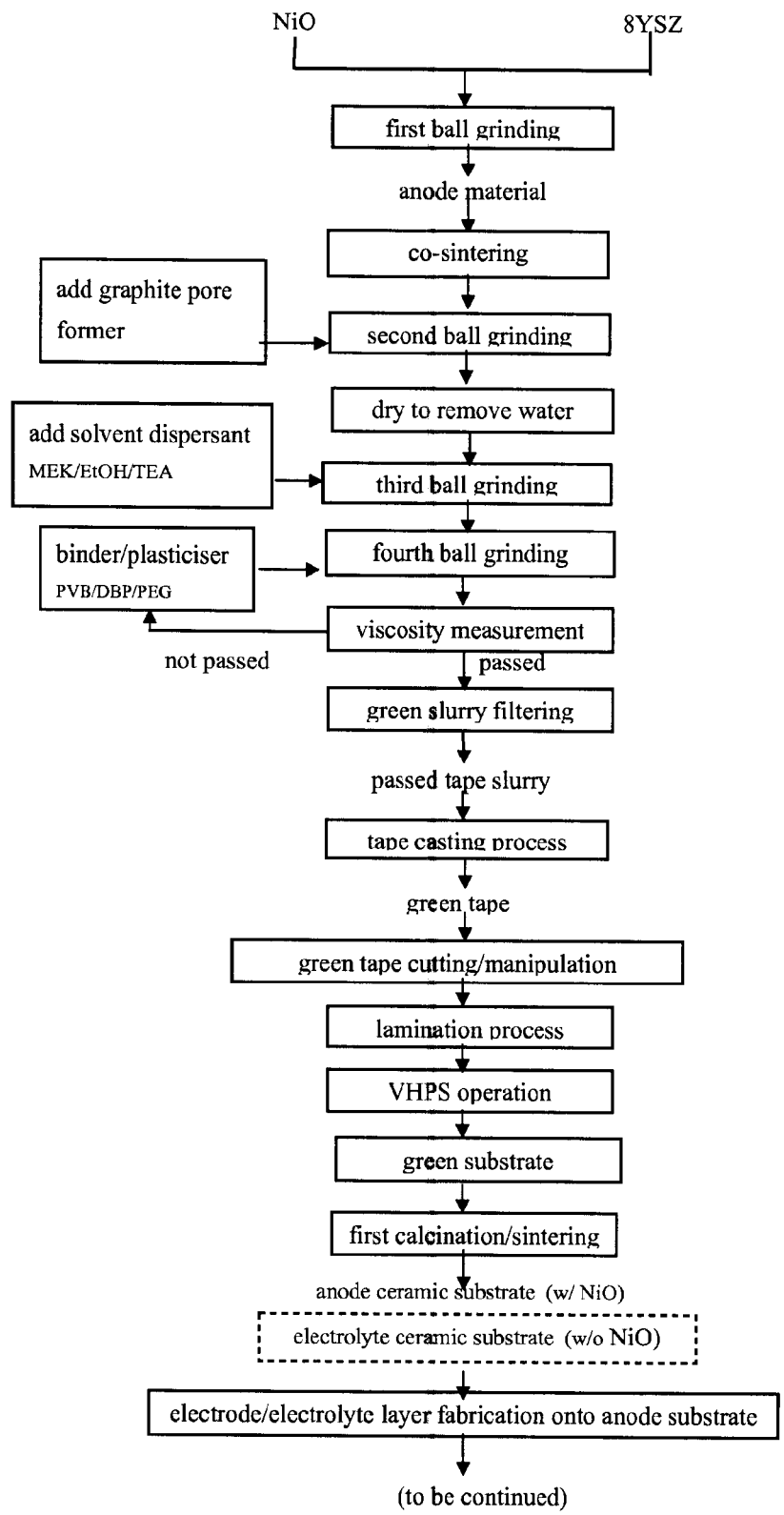
FIG. 1 is a novel synergistic process for fabrication of a high integrity membrane electrode assembly of solid oxide fuel cell.
Figure 1:
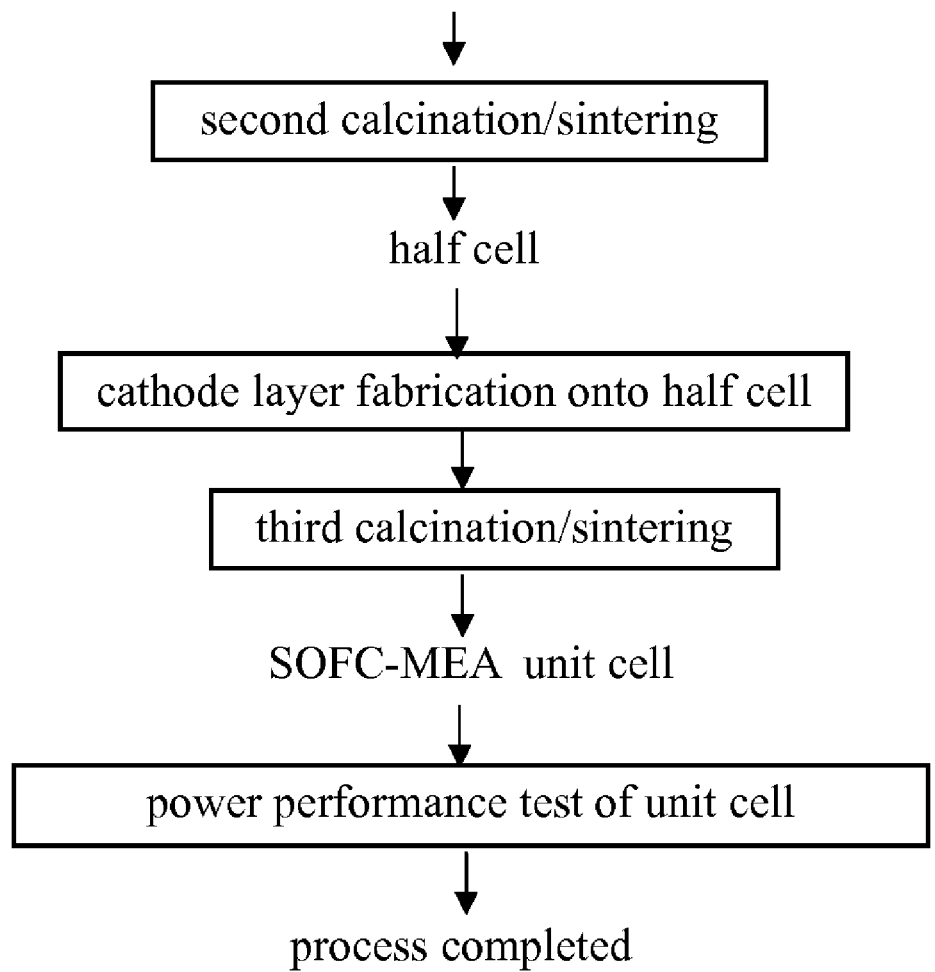

The invention is related to the recipe and novel processes for producing SOFC-MEA (refer to FIG. 1 for the brief processes), a high integrity solid oxide fuel cell—membrane electrode assembly or unit cell. The main content in the invention includes "one recipe and two processes for producing green substrates and electrode ceramic substrate. The application methods are described below:

(1) Recipe slurry and processes for electrode green substrate. This part of invention at least includes the following steps:

Step 1: Add self-made or purchased 8YSZ and NiO powders in a certain weight ratio (NiO is 35~65 wt % of NiO+8YSZ; its QOV value is 50 wt %) and zirconium dioxide grinding balls into a jar for 24~168 (adjustable) hours of grinding to attain highly uniform powder mixture. Its uniformity can be judged by SEM analysis. If necessary, additional grinding time and speed are used. The average particle diameter is targeted at 300~500 nm (adjustable based on requirements). The powder is named Anode-P-1. Powder properties include particle diameter, specific area, and uniformity (EDX-Mapping), which are filed as references and review. This is the first work to prepare slurry for electrode green substrate. The main recipe is listed in Table 1. It is the first part of IP for the invention.

Step 2: The powder Anode-P-1 is taken out and placed in the zirconium dioxide plate which is then put in high-temperature furnace for co-sintering treatment at 1200~1600° C. for 2~8 hours (adjustable). Then, it is subject to grinding by ball mill as in step 1, so this makes particle diameter around 300~500 nm (adjustable if necessary) and high uniformity. This kind of powder is called Anode-P-2. To adjust the porosity for the final substrate, a proper amount of pore former (graphite is a typical material) is added to Anode-P-2. Then it is subject to repeated grinding for a few hours (preferably over 24 hours) and becomes the powder called Anode-P-3.

Step 3: Take a certain amount of Anode-P-3 to dry at 100° C. for several tens of hours (preferably over 24 hours, to remove moisture and water). According to the recipe in Table 1, take organic solvents MEK, EtOH in a certain ratio and dispersant TEA to add to grinding jar with zirconium dioxide ball for grinding for several tens of hours (preferably over 24 hours) to assure the system uniformity. This uniform slurry of solvent and dispersant is called SD.

Step 4: Add dried powder Anode-P-3 into SD slurry to grind in liquid state for several tens of hours (preferably over 48 hours), so this makes even mixing of powder, solvent and dispersant and produces the slurry called SL-1.

Step 5: according to Table 1 recipe, take a certain amount of plasticizer PEG and binder PVB to add into slurry SL-1. Continue the grinding for several tens of hours (about 48~72 hours) to assure complete system uniformity and the quality for anode substrate slurry that is suitable for tape casting process, called SL-2. Use viscometer to measure and note the viscosity for SL-2 and check it characteristics.

Step 6: Use micro-adjustment technique to add a proper amount of binder in different stage, while plasticizer can regulate SL-2 viscosity 150~1500 CP (QOV=200~500 CP). The recipe effect for this part depends on personal experience, technology and capability to determine the number and duration for trial and error operation. The final tape casting slurry is called SL-T.

Step 7: Process slurry SL-T with tape casting system to produce green tape, which width depends on the requirement, generally around 18~30 cm. The single layer thickness is around 10~300 μm (whether to increase single layer thickness depending on the requirement and tape casting system performance).

Step 8: Use cutting tools or punch to cut green tape into single layer green tape in certain size and shape (usually square or circle). According to thickness requirement, send the stack of single layer green tapes into laminator (LM) to produce shaped green substrate (GT-1). The laminator (LP) pressure is set to 13.79~34.48 MPa (2000~5000 psi), and temperature is 50~100° C. GT-1 thickness can be 100~1500 μm. Substrate thickness QOV=600~1200 μm. GT1 green density is measured by Pycnometer.

(2) Electrode Ceramic Substrate Fabrication Process

Figure 2:
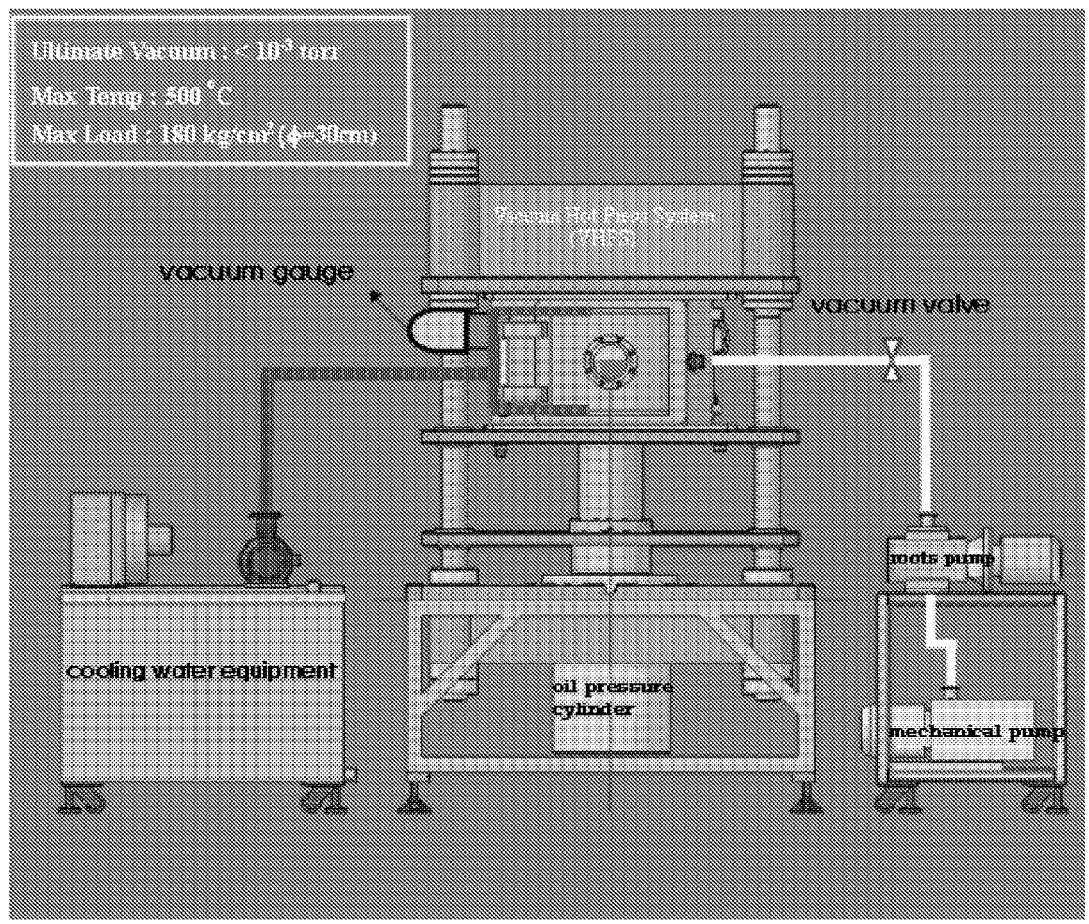
FIG. 2 is a brief illustration for the vacuum hot press system (VHPS) in the invention.

Step 1: Put green substrate (GT-1) (dimension $5 \times 5$ $cm^2$~$15 \times 15$ $cm^2$ (or larger), thickness close to 600~1200 μm) in a mold of $5 \times 5$ $cm^2$ or suitable size. Send it to "vacuum hot press system (VHPS) (details as in FIG. 2) for vacuum, less than $1.33 \times 10^{-7}$ MPa ($1 \times 10^{-3}$ torrs), heat (temperature <500° C.), and pressure up to 1158.3 MPa ($1.68 \times 10^5$ psi) treatment. The high-density green substrate (GT-2) after this process has green density measured by Pycnometer and up to 70% of the theoretical density for the same ceramic oxides.

Step 2: If necessary, surface treatment for GT-2 can be done by LM lamination. Such substrate enhancing process by LM and VHPS is called A Novel Synergistic Process. The substrate made from the process is called GT-F.

Step 3: Press and position GT-F with zirconium dioxide substrate (in sandwich structure). Place it in a high temperature furnace with aluminum oxide/Zirconium oxide setters as support (temperature up to 1700° C.) for two-stage cyclic sintering process. The first cycle temperature control is: room temperature→200° C. (4 Hr)→450° C. (2 Hr)→750° C. (2 Hr)→1250° C. (6 Hr)→room temperature. And the second cycle temperature control is: room temperature→1400° C. (4 Hr)→room temperature. The increasing and decreasing rates for temperature are the same for the two stages and kept at 1° C./min (preferably within 3° C./min). A certain amount of air is passed in. The first cycle sintering is to remove all organic additives. The second cycle sintering is to produce ceramic substrate by sintering and densification. The produced electrode substrate is called AS-1, which needs to be characterized for sintering density, mechanical strength, and porosity and microstructure et al. Such AS-1 electrode substrate has high mechanical strength, flatness, suitable porosity and gas permeability to satisfy the basic requirements of SOFC-MEA electrode structure.

Step 4: AS-1 is subject to Screen Printing, Sputtering Coating, Spin Coating or Plasma Spray. Then it is subject to coating with an electrode layer in less than 10 μm. It is put in high temperature sintering furnace (1400° C./4 Hr) with the increasing and decreasing rates for temperature at 1° C./min to produce SOFC-MEA half cell, called AS-H.

Figure 3:
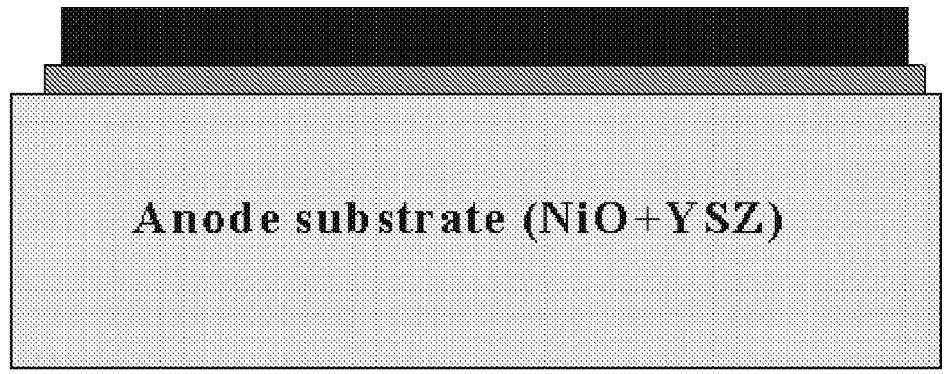
FIG. 3 is the structure diagram and actual object diagram for the planar SOFC Anode Supported Cell (ASC) in the invention.
Figure 3:
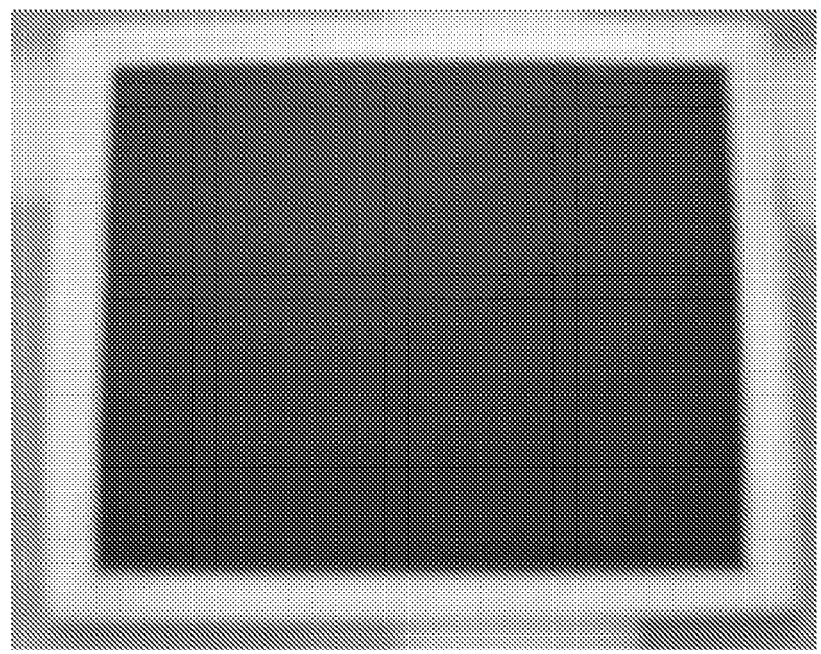

Step 5: AS-H half cell is subject to screen-printing for coating LSM (or LSCF material) cathode layer in 30~50 μm (adjustable) onto YSZ layer. Then it is put in a high-temperature sintering furnace (1200° C./3~4 Hr) with the increasing and decreasing rates for temperature at 1° C./min (preferably less than 3° C./min). The product is called ASC-I, which is anode support cell (also called ASC type SOFC-MEA)(details as shown in FIG. 3 for multiple/functional layer anode substrate (NiO+YSZ)).

The ASC type SOFC from the above processes can convert a variety of fuels like hydrogen, natural gas and hydrocarbons into electric output. The following will describe some examples in details for the invention:

Example 1

Production of SOFC Anode Substrate and Unit Cell with High Mechanical Strength and Suitable Porosity (20~30 vol %)

Figure 4:
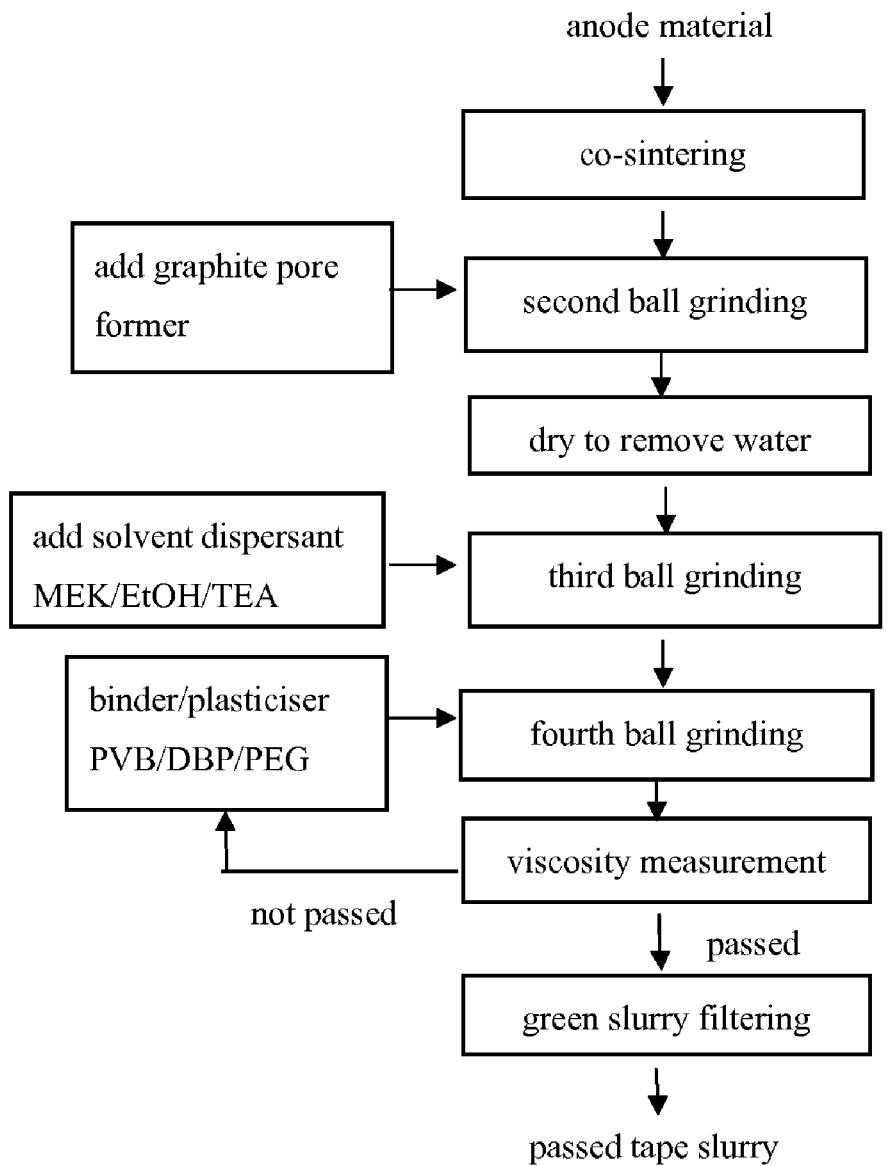
FIG. 4 is the slurry recipe and process for the fabrication of SOFC-MEA electrode substrate in the invention.

The example is about production of a planar SOFC anode substrate with high mechanical strength and suitable porosity (20~30 vol %) and its unit cell for powder supply test and powder generation. The production includes two stages. The first stage is about (1) NiO+YSZ anode green substrate slurry recipe and processes, including 8 steps in total, and (2) anode ceramic substrate production process, 5 steps in total, which are described respectively in the following:

(1) NiO+8YSZ anode green substrate slurry recipe and processes consist of the following steps (as shown in FIG. 4):

Step 1: Mix 175 grams of 8YSZ with cubic crystal structure and equal amount of NiO (average particle diameter 1000 nm) and place them in a jar containing $ZrO_2$ grinding balls (about 250 grams) for 168 hours of grinding. This allows complete mixing of NiO and 8YSZ to become highly uniform powder mixture. SEM can analyze its uniformity. If necessary, additional grinding time and speed can be used. The goal of grinding is to get particle diameter 300~500 nm. The powder is called Anode-P-1. Powder properties include particle diameter, specific surface area, and uniformity (EDX-Mapping), which are filed as references and review.

Step 2: Take powder Anode-P-1 out of a grinding jar and place it in a zirconium dioxide plate which will be put in a high-temperature sintering furnace at 1400° C./4 hours for co-sintering. After that, repeat step 1 grinding process to make particle diameter 300~500 nm and uniform. This co-sintered powder is called Anode-P-2. Add 3.5 grams of sub-micrometer/nanometer graphite powder into Anode-P-2 and repeat grinding for over 24 hours to assure high uniformity. The powder is called Anode-P-3. It total weight is 353.5 grams.

Step 3: Take 353.5 grams of Anode-P-3 and dry it at 100° C. for over 24 hours to remove water and moisture. Weigh 78.1 grams of MEK, 25.27 grams of EtOH and 8.05 grams of TEA into a grinding jar containing $ZrO_2$ Ball for grinding for over 24 hours to assure uniformity. The solvents and dispersant are liquid and the mixture is called SD solution, which total weight is 111.42 grams.

Step 4: Add dried Anode-P-3 powder into SD solution and grind in liquid state for over 48 hours. This allows powder, solvents and dispersant to mix uniformly into slurry, called SL-1, which total weight is 464.92 grams.

Step 5: Weigh 4.59 grams of DBP plasticizer, 4.59 grams of PEG and 19.55 grams of PVB binder into slurry SL-1. Continue grinding in liquid state for over 48 hours to assure system uniformity. The product is the anode substrate slurry suitable for tape casting process and called SL-2 which total weight is 463.65 grams. Then, viscometer is used to measure and note the viscosity of SL-2 and inspect SL-2 properties.

Figure 5:
FIG. 5 is the diagram of the slurry for the fabrication of high-integrity electrode green substrate in the invention.

Step 6: To make fine adjustment, suitable amount of PVB binder is added in different stages with plasticizer DBP/PEG to regulate the viscosity of SL-2 around 150~1500 cp (optimum viscosity around 200~500 cp). At the same time, inspect formability for the green tape. This adjustment depends on personal experience and technique/capability for the time and number of trial and error. The final tape slurry or slip slurry is called SL-T. Its viscosity is about 328 cp (as shown in FIG. 5).

Figure 6:
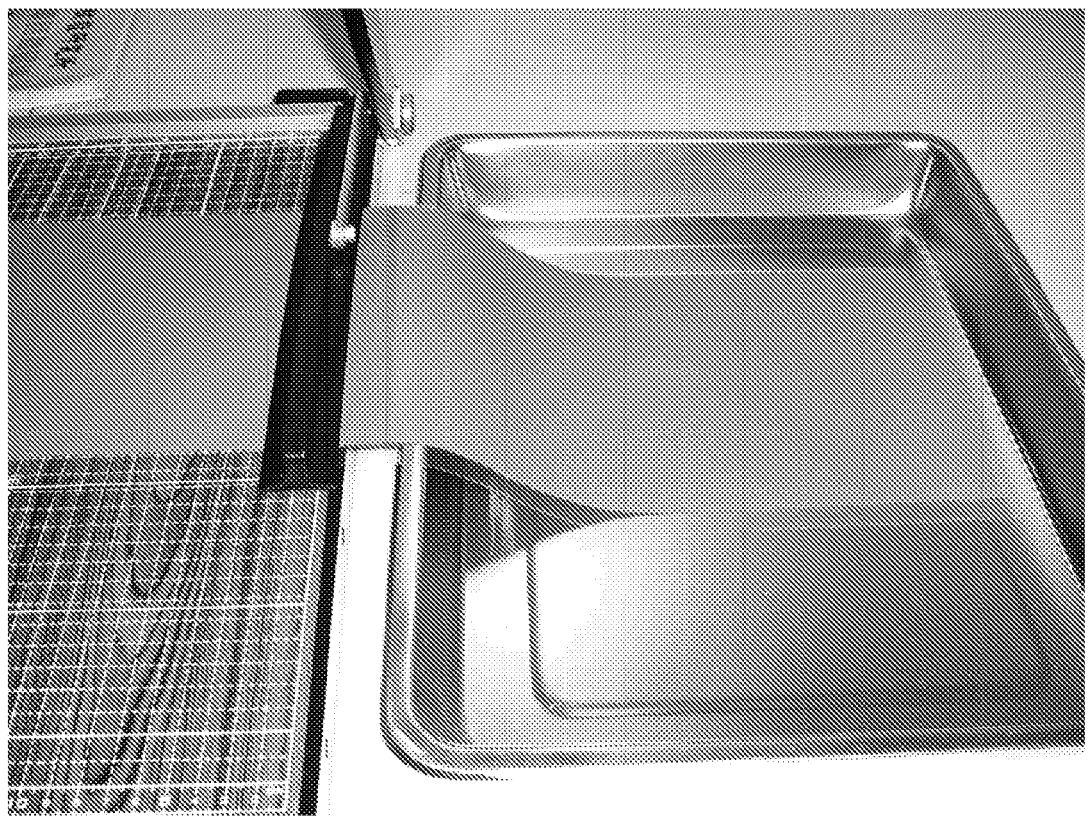
FIG. 6 is the diagram of the actual object of green tape of the high-integrity electrode substrate in the invention.

Step 7: Process tape slurry SL-7 with tape casting system to produce green tape, which width depends on the suitability for specific tape casting system, between 18 and 20 cm. The single layer thickness is about 100 µm. The length is determined by the amount of Anode-P-1 feeding powder (as shown in FIG. 6).

Figure 7:
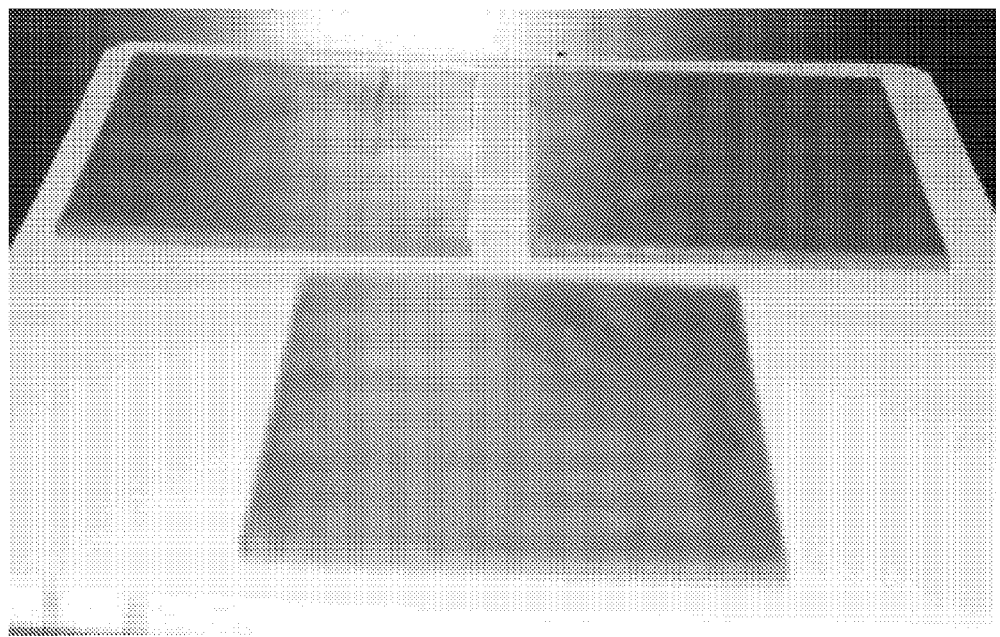
FIG. 7 is the diagram of the actual object of the high-integrity green substrate of the electrode substrate in the invention.

Step 8: Use cutting tools or punch to cut green tape into single layer green tape in 5×5 cm² or 10×10 cm² (adjustable in size and shape) with thickness 100 µm. Send the stack of 12 single layer green tapes into high-pressure laminator (LM) to produce shaped (square) green substrate (GT-1) with thickness 1200 µm. The pressure for the laminator in this step is set at 13.79~34.48 MPa (2000~5000 psi), temperature at 50~100° C. The green density for GT1 is measured by Pycnometer (details as shown in FIG. 7).

(2) The fabrication process for anode ceramic substrate consists of the following steps:

Step 1: Place green substrates GT1 (square with dimensions 5×5 cm² and 10×10 cm², thickness 1200 µm) into a 5×5 cm² mold and a 10×10 cm² mold respectively (mold material is stainless steel, plated with WC). Then send them to vacuum hot press system (VHPS) for further treatment (vacuum less than $1.33 \times 10^{-7}$ MPa ($1 \times 10^{-3}$ torrs), temperature <500° C.). Its pressure is up to 1158.3 MPa ($1.68 \times 10^5$ psi) (adjustable). The high-density green substrate from the process (called GT-2) has green density measured by Pycnometer, and up to 70% of the theoretical density of the same ceramic oxides.

Step 2: If necessary, further surface finishing for GT-2 can be done through LM lamination. Such process using LM and VHPS to enhance green substrate strength is called "a novel synergistic process". The finished product from the process is called GT-F. The size of GT-F is determined by the product requirement and the VHPS mold size.

Figure 8:
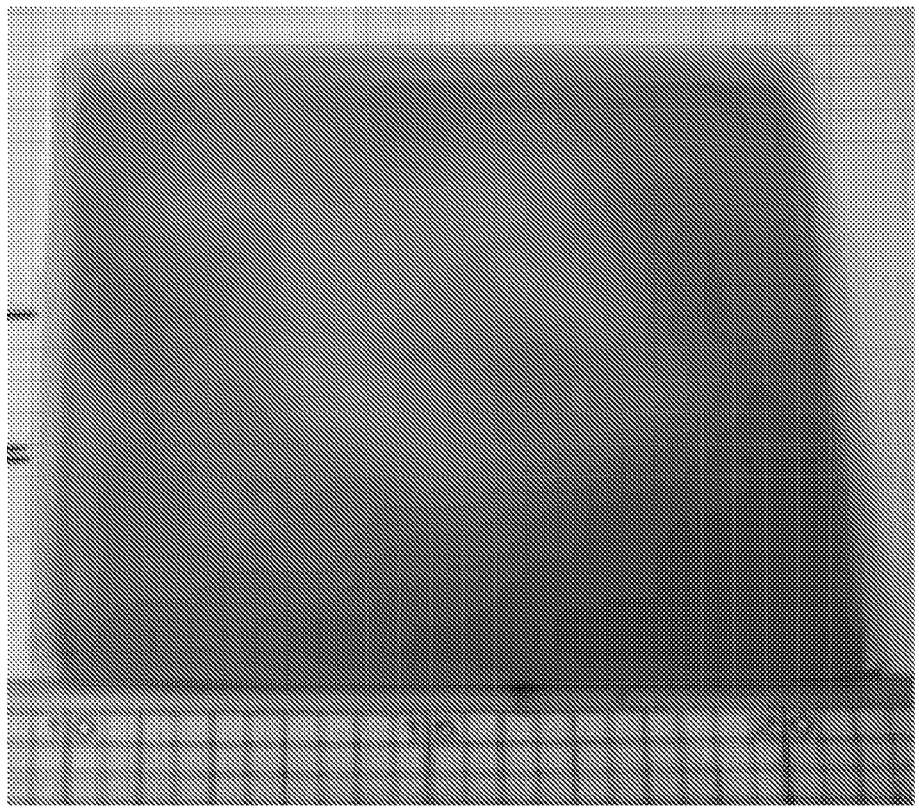
FIG. 8 is the diagram of the actual object of the high-integrity electrode substrate.
Figure 8:

Step 3: Use zirconium dioxide substrates to press GT-F (in sandwich structure) and place it in a zirconium dioxide support plate in a high-temperature furnace (temperature up to 1700° C.) for a two-stage cyclic sintering process. The first cycle temperature control is room temperature→200° C. (4 Hrs)→450° C. (2 hrs)→750° C. (2 hrs)→1250° C. (6 hrs) →room temperature. The second cycle temperature control is room temperature→1400° C. (4 hrs)→room temperature. The increasing and decreasing rates for temperature for the two stages are kept at 1° C./min (preferably within 3° C./min). A certain amount of air is also supplied to the system. The produced electrode substrate is called AS-1 (FIG. 8), which properties are shown in Table 3.

TABLE 3

Properties of Anode Substrate

| Property | Description |
|---|---|
| 1. size | L × W × H (Thickness) = 50 mm × 50 mm × 1000 µm & 100 mm × 100 mm × 1000 µm |
| 2. shape | Planar/high flatness |
| 3. mechanical strength | a. 67.1 Mpa (T = 25° C.) 82.91 Mpa (T = 700° C.) 76.17 Mpa high flatness (T = 800° C.) |
| 4. porosity (T = 25° C.) | a. initial value = 14.534% b. value after H2 reduction = 26.1187% |
| 5. air/gas permeability (T = 25° C.), initial value | 16.53 cm³/Mpa-cm²-sec ($1.14 \times 10^{-4}$ l/psi-cm²-sec) |

Figure 9:
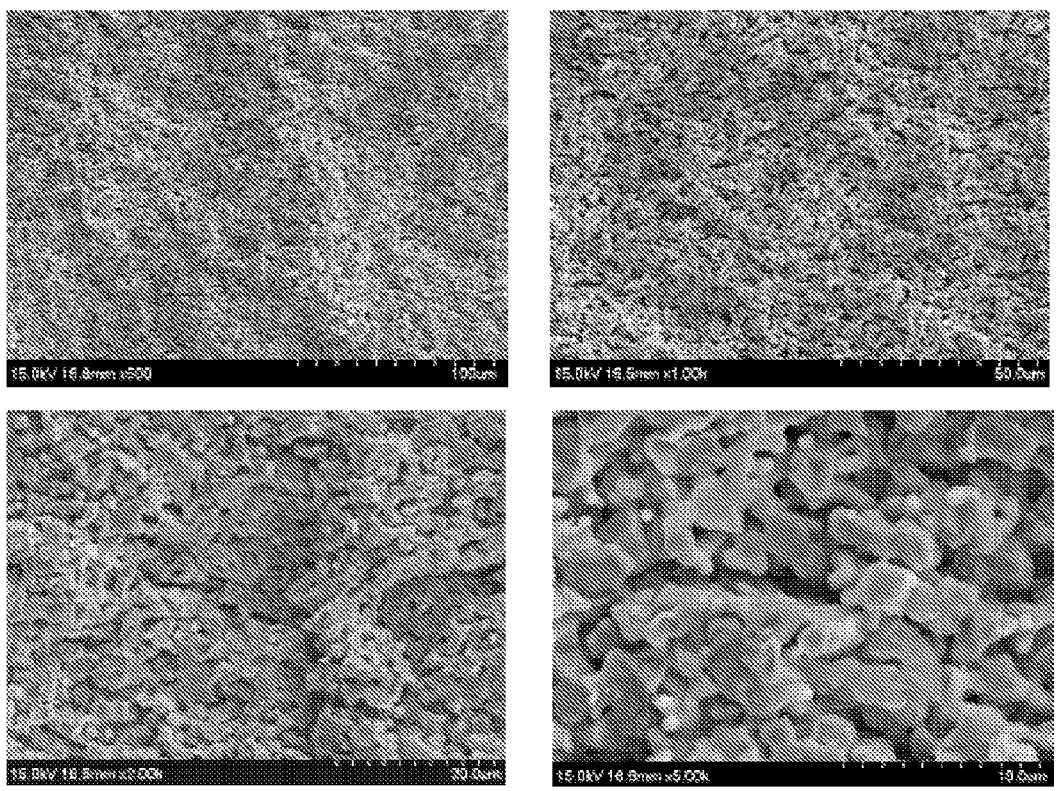
FIG. 9 is the microstructure and property diagram for the high-integrity electrode substrate.

It shows AS-1 anode substrate has high mechanical strength and surface flatness as well as suitable amount of porosity and gas permeability, which satisfy SOFC-MEA anode structural requirements (as shown in FIG. 9).

Step 4: Use screen printing/spin coating/sputter coating equipments and processes to coat about 10 μm electrolyte (8YSZ material) layer onto the anode substrate AS-1 and place it in a high-temperature furnace at 1700° C. for sintering at 1400° C./4 hrs, with increasing and decreasing rates of temperature 1° C./min. The SOFC-MEA half cell from the process is called AS-H.

Figure 10:
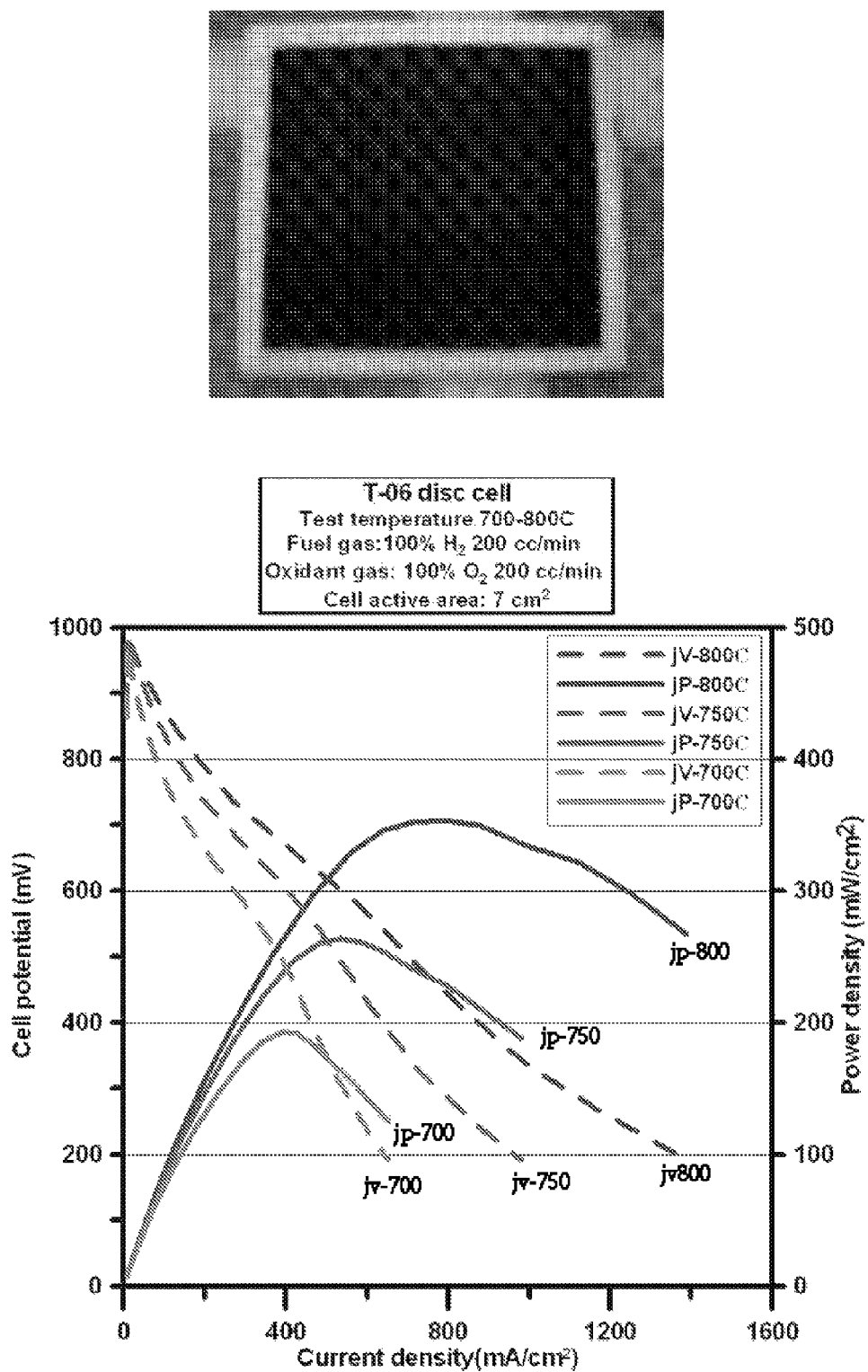
FIG. 10 is the diagram of the actual object and the electric performance testing results for the SOFC-MEA (unit cell) produced from the high-integrity electrode substrate.

Step 5: Use screen-printing equipment and process to coat about 40 μm LSM layer onto the 8YSZ electrolyte layer of the AS-H half cell to produce a full cell, called AS-WC. Place AS-WC in the high-temperature furnace for another sintering process (1200° C./3 hrs) with increasing and decreasing rates of temperature at 1° C./min. The produced SOFC-MEA is called AS-C-I (details in FIG. 10), which a complete anode supported cell (also called ASC type SOFC-MEA). On ASC-I, the electric powder density measured by a simple Probostat System can be up to 32 mW/cm$^2$ (test area=πcm$^2$, temperature=900° C.). If the test area is 4×4 cm$^2$, the electric powder density is larger than 350 mW/cm$^2$ (temperature at 800° C.). (prototype MEA not optimized product).

What is claimed is:

1. A method for fabrication of a membrane electrode assembly for a solid oxide fuel cell (MEA) comprising the steps:
   i. Produce either an electrode green substrate or an electrolyte green substrate, comprising the steps:
   (1) Place powdered NiO and 8YSZ, if producing an electrode green substrate, or powdered 8YSZ, if producing an electrolyte green substrate, in a jar;
   (2) Grind the powder placed in the jar with zirconium dioxide grinding balls to reduce the mean particle diameter of the powder and designated the ground powder as powder A;
   (3) Sinter powder A in a furnace, remove the sintered powder A from the furnace, and grind the sintered powder A at room temperature with zirconium dioxide grinding balls;
   (4) After grinding the sintered powder A, add a pore former to the sintered powder A and grind the sintered powder A with the pore former at room temperature in order to further reduce the mean particle size of the sintered powder A;
   (5) Dry the sintered powder A and pore former to remove moisture and water, and designate the resultant powder as powder B;
   (6) Combine organic solvents, TEA, and powder B to form a mixture, and mix the mixture with zirconium dioxide grinding balls until the solvents, TEA, and powder B are evenly mixed;
   (7) Combine the mixed mixture with additional powder B, grind the mixed mixture and powder B together until an evenly mixed slurry as slurry C is obtained, and designate the evenly mixed slurry as slurry C;
   (8) Combine plasticizers DBP and PEG, binder PVB, and slurry C; grind with zirconium dioxide grinding balls after combing; and designate the ground slurry as initial green slurry;
   (9) Add a binder and a plasticizer to the initial green slurry and designated the initial green slurry with additional binder and plasticizer as final slurry;
   (10) Use known tape casting processes to produce green tape from the final slurry;
   (11) Cut the green tape into a plurality of green tapes and laminate the plurality of green tapes together to produce a shaped green substrate;
   (12) If powdered NiO and 8YSZ was placed in a jar in step (1), the shaped green substrate is also designated as electrode green substrate, and if 8YSZ only was placed in the jar in the first step of the process, the shaped green substrate is also designated as electrolyte green substrate;
   ii. Produce either an electrode ceramic substrate or an electrolyte ceramic substrate, comprising the steps:
   (13) Place the shaped green substrate in a metal mold and subject the shaped green substrate to vacuum hot pressing; wherein the vacuum hot press air pressure is less than $1.33 \times 10^{-7}$ MPa, heat applied to the shaped green substrate is less than 500° C., and pressure applied to the shaped green substrate is below 1158.3 MPa; and designate the vacuum hot pressed shaped green substrate as high-density green substrate;
   (14) Place the high-density green substrate on a zirconium dioxide ceramic substrate so as to form a stack, place the stack on aluminum oxide setters in a furnace, and subject the stack in the furnace to a two-stage sintering cycle in which all temperature incrementing and decrementing is below 3° C./minute, wherein:
   (a) The stack begins the cycle at room temperature and is then heated to 200° C.;
   (b) The stack is held at 200° C. for 4 hours and is then heated to 450° C.;
   (c) The stack is held at 450° C. for 2 hours and is then heated to 750° C.;
   (d) The stack is held at 750° C. for 2 hours and is then heated to 1250° C.;
   (e) The stack is held at 1250° C. for 6 hours and is then cooled to room temperature;
   (f) The stack is heated from room temperature to 1400° C.;
   (g) The stack is held at 1400° C. for 4 hours and is then cooled to room temperature;
   (15) Designate the high-density green substrate that has been subjected to the two-stage sintering cycle as a high-integrity ceramic substrate;
   (16) Apply an additional layer to the high-integrity ceramic substrate via either screen printing, sputtering, spin coating, or plasma spray; wherein the additional layer is an electrode layer if the high-integrity ceramic substrate was produced from an electrolyte green substrate, and wherein the additional layer is an electrolyte layer if the high-integrity ceramic substrate was produced from an electrode green substrate;
   (17) Place the high-integrity ceramic substrate and additional layer in a furnace and sinter, so as to produce a MEA half cell;
   (18) Apply a coating of LSM or LSCF to the half cell by screen printing, spin coating, plasma spray, or slurry spray;
   (19) Place the coated half cell in a furnace and sinter, so as to produce a MEA unit cell.

2. The method of claim 1, wherein if the NiO and 8YSZ are placed in a jar in step (1), so as to produce an electrode green substrate, the total NiO and 8YSZ powder added is between 35 and 65 percent by weight NiO.

3. The method of claim 1, where in step (2) the powder is ground for 24-168 hours, and the resulting mean particle diameter of the powder is between 300 and 500 nm.

4. The method of claim 1, where in step (3) the sintering is performed at 1200-1600° C. and the grinding is performed for 24 hours or more, and in step (4) the mean particle size is 300 to 500 nm after grinding.

5. The method of claim 1, where in step (6) the mixing is performed for 24 hours or more.

6. The method of claim 1, where in step (7), the grinding is performed for 48 hours or more.

7. The method of claim 1, where in step (8), the grinding is performed for 48-72 hours.

8. The method of claim 1, wherein the final slurry has a viscosity of 150-1500 CP.

9. The method of claim 1, wherein the green tape produced in step (10) has a thickness dimension of 10-300 microns, and a width dimension of 18-30 cm.

10. The method of claim 1, wherein the shaped green substrate is 600-1200 microns thick and has a shaped of a square prism having base side lengths of 5-15 cm or a cylinder having base diameter of 5-15 cm, and the tapes are laminated at 50-100° C. and 13.79-34.48 MPa.

11. The method of claim 1, where the vacuum hot press air pressure is $10.33 \times 10^{-7}$ MPa.

12. The method of claim 1, where the additional layer applied in step (16) is 10 microns thick, and the sintering process of step (17) is a one-stage heat cycle wherein temperature begins at room temperature, temperature is then incremented to 1400° C., temperature is then held at 1400° C. for 4 hours, and temperature is then decremented to room temperature, and wherein the temperature incrementing and decrementing is below 3° C./minute.

13. The method of claim 1, where the coat of LSM or LSCF applied in step (18) is 30-50 microns thick, and the sintering process of step (19) is a one-stage heat cycle wherein temperature begins at room temperature, temperature is then incremented to 1200° C., temperature is then held at 1200° C. for 3 hours, and temperature is then decremented to room temperature, and wherein the temperature incrementing and decrementing is below 3° C./minute.

* * * * *